No. 745,593. PATENTED DEC. 1, 1903.
G. H. GIBSON.
MAGNETO FRICTIONAL GEARING.
APPLICATION FILED APR. 4, 1903.
NO MODEL.
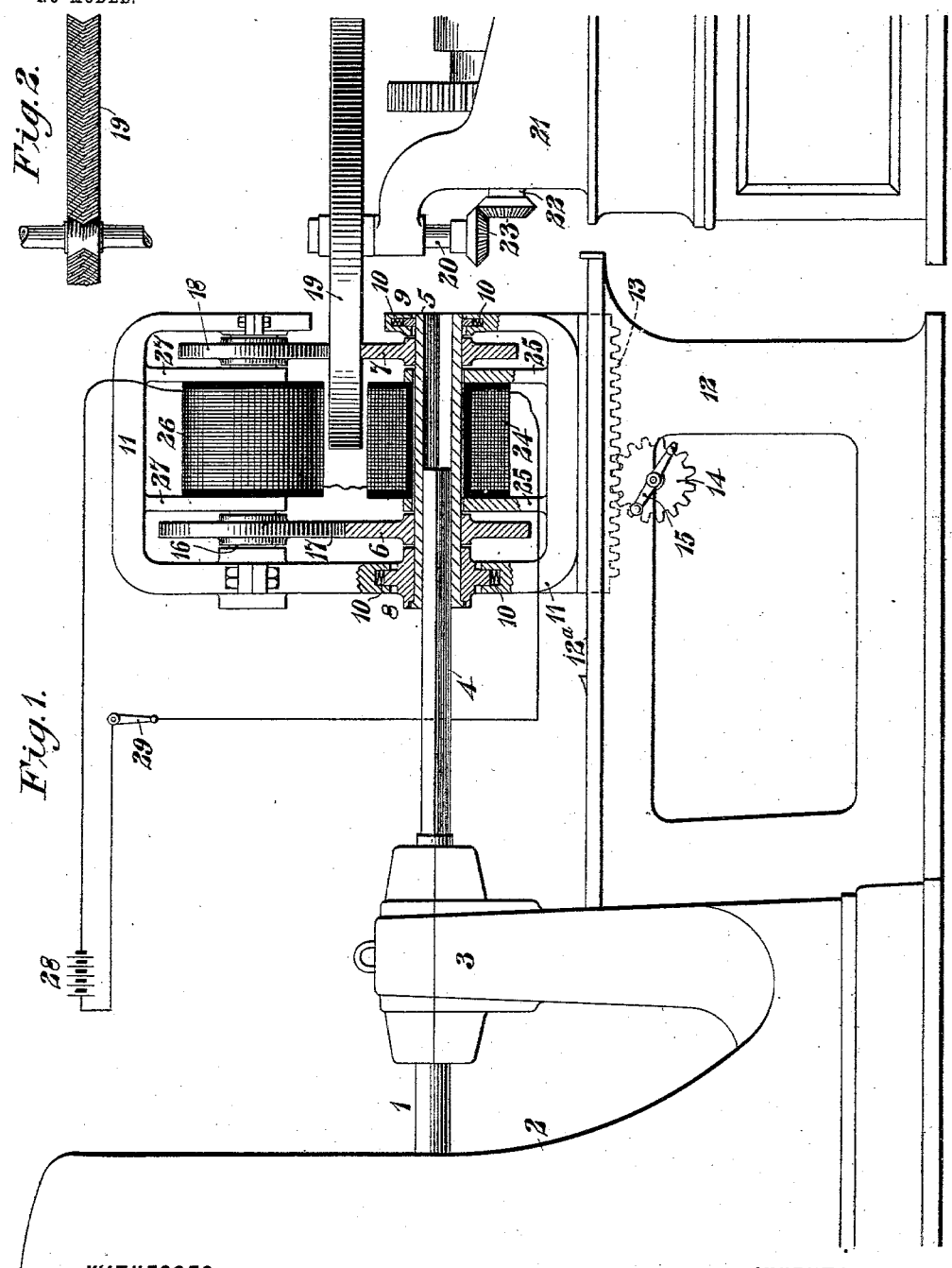
WITNESSES:
C. L. Belcher
Birney Hines
INVENTOR
George H. Gibson
BY
Wesley G. Carr
ATTORNEY.

No. 745,593. Patented December 1, 1903.

UNITED STATES PATENT OFFICE.

GEORGE H. GIBSON, OF HYDEPARK, MASSACHUSETTS, ASSIGNOR TO WESTINGHOUSE ELECTRIC & MANUFACTURING COMPANY, A CORPORATION OF PENNSYLVANIA.

MAGNETO FRICTIONAL GEARING.

SPECIFICATION forming part of Letters Patent No. 745,593, dated December 1, 1903.

Application filed April 4, 1903. Serial No. 151,198. (No model.)

*To all whom it may concern:*

Be it known that I, GEORGE H. GIBSON, a citizen of the United States, and a resident of Hydepark, in the county of Suffolk and State of Massachusetts, have invented a new and useful Improvement in Magneto Frictional Gearing, of which the following is a specification.

My invention relates to gearing for transmitting power from one shaft or rotating part to another, and more especially to that type of gearing which provides for varying the speed of the shaft or other moving part to which the power is transmitted.

The object of my invention is to provide a gear which shall be both simple in construction and effective in operation and the use of which shall permit of a uniform gradation of speed between widely-separated limits and in which the adhesive force exerted between the driving and driven frictional surfaces shall be large, uniformly maintained, and so applied that the mechanical strains exerted upon the driving and the driven members shall be relatively small.

My invention is illustrated in the accompanying drawings, in which—

Figure 1 is a view, partially in side elevation and partially in section, of my improved gearing and portions of the machines from and to which the power is transmitted thereby. Fig. 2 is a detail sectional view of a portion of the driven friction-disk.

The driving-shaft 1 is here indicated as the shaft of an electric motor 2, but it may constitute a part of or be geared to the rotating member of any suitable driving-motor. This shaft 1 is extended beyond one of its bearings 3, and the extension 4 is squared to make a sliding but non-rotative fit in a sleeve or hollow shaft 5, the exterior of which may be cylindrical in form and provide bearing-supports near its respective ends for two disks 6 and 7, of magnetizable material, the respective ends of the sleeve or hollow shaft 5 being mounted in boxes 8 and 9, which are cushioned at top and bottom by springs 10, so as to be capable of a slight vertical movement. These bearing-boxes are supported in a frame 11, of non-magnetic material, which is in turn supported in ways $12^a$ in a base-frame 12 and is provided with a rack 13, with which engages a pinion 14, having a suitable arm or crank 15 for rotating it. This rack and pinion are shown merely as indicative of any suitable means for moving the frame 11 along its ways gradually and to any extent desired.

Mounted in the frame 11 directly above the sleeve or hollow shaft 5 is a shaft 16, on which are rotatably mounted magnetizable disks 17 and 18, the former being in the same plane with the disk 6 and of such diameter that the peripheries of the two disks are in frictional engagement. The disk 18 is also in the same plane as the disk 7; but the two are of such diameter as to receive between them a larger horizontal disk 19, also of magnetizable material. This disk is rigidly mounted upon a vertical shaft 20, which has its bearings in the frame 21 of the machine, the moving parts of which are to be driven by the gearing. As here indicated, the power is transmitted from the vertical shaft 20 to a horizontal shaft 22 by means of bevel-gears 23, and from the shaft 22 the power may be further transmitted by means of any suitable gearing or be directly applied to the tool or other working device which is to be utilized in the machine, as may be found convenient or desirable in practice.

Surrounding the hollow shaft or sleeve 5 is an electromagnet 24, which is supported from the frame 11 by means of brackets 25, and a similar magnet 26 surrounds the shaft 16 and is supported from the top of the frame 11 by means of brackets 27. These magnets 24 and 26 may be energized by means of current derived from any suitable source, a battery 28 being here indicated as a typical source of current, the circuit of the battery being shown as supplied with a switch 29 in order to open and close the same as may be desired.

It will be seen that since the disks 6, 7, 17, 18, and 19 are of magnetizable material, such as iron or steel, the magnetic flux produced by the coils 24 and 26 will make a circuit through the disks and the horizontal shafts upon which the smaller disks are mounted, and thus serve to draw together the disks, which make engagement with each other and effect a close frictional engagement.

In case the action of the magnetically-induced currents upon the disk 19 is such as to unduly heat the material it may be made of laminated form by winding a strip of iron or steel into disk form, as is indicated in Fig. 2, the strip being bent or crimped longitudinally in order to prevent displacement of any of its turns.

Any variation in speed that is desired may be effected by moving the frame 11 toward or away from the axis of the disk 19 by means of the rack 13 and the pinion 14.

The form of gearing shown is advantageous as compared with such as have been heretofore employed in that no pressure is produced upon the bearings of any of the shafts by reason of forcing the driving-disks against the driven disks. Two driving-disks act upon the driven disk 19 instead of one, as is usual, and the pressure upon the driven disk being balanced there is no tendency to distortion or end thrust upon the shaft 20.

Such variations in the form and dimensions of parts as may be made by one skilled in the art without materially changing the mode of operation and result are to be understood as included within the spirit and scope of my invention.

I claim as my invention—

1. The combination with a driven shaft provided with a friction-wheel, of a driving-shaft, a pair of friction-wheels connected to said driving-shaft and respectively making peripheral engagement with the opposite faces of the wheel on said driven shaft and means for magnetizing said wheels to increase the adhesion between them and the driven wheel.

2. The combination with a driving-shaft and a shaft to be driven thereby, of a magnetizable friction-wheel on the driven shaft, a pair of magnetizable wheels connected to the driving-shaft and making frictional engagement with the faces of said driven wheel, in opposition, and one or more magnetizing-coils the magnetic circuit of which is through said wheels and disk.

3. The combination with a driving-shaft and a shaft to be driven thereby, of a non-magnetic frame, magnetizable friction-wheels mounted in said frame, a magnetizable wheel carried by the driven shaft, the faces of which are oppositely engaged by two of the wheels mounted in said frame and one or more magnetizing-coils the magnetic circuit of which is through said wheels.

4. The combination with a driving-shaft and a machine to which power is to be applied from said shaft, of an adjustable frame having two parallel shafts mounted therein one of which is directly engaged by the driving-shaft and both of which are provided with magnetizable friction-wheels, a driven wheel or disk from which power is applied to the driven machine and with which two of the friction-wheels in said frame engage and one or more electromagnets the magnetic circuit of which is through said friction-wheels.

5. The combination with a driving-shaft and a frame longitudinally adjustable with reference thereto, of a hollow shaft or sleeve mounted in said frame and having a longitudinal but non-rotative adjustment with reference to the driving-shaft, two magnetizable friction-wheels journaled upon said hollow shaft, a shaft mounted in said adjustable frame parallel to said hollow shaft and having two magnetizable friction-wheels journaled thereon one of which makes frictional engagement with the corresponding wheel on the hollow shaft, a driven wheel or disk with the two plane faces of which the other friction-wheels make respective engagement and one or more electromagnets the magnetic circuits of which are through said friction-wheels and serve to draw them into engagement with each other.

6. The combination with a driving-shaft having a non-cylindrical projecting end, of a non-magnetic frame, a sleeve or hollow shaft that makes a sliding, non-rotatable fit upon the non-cylindrical end of the driving-shaft, means for adjusting said frame longitudinally of the driving-shaft, a second shaft mounted in said frame, two pairs of friction-wheels journaled upon the shafts mounted in said frame, two of which are in peripheral engagement, a driven wheel or disk with the plane faces of which the other two friction-wheels engage and one or more electromagnets the magnetic circuit of which is through said friction-wheels.

7. The combination with a driving-shaft and a shaft to be driven thereby, of a magnetizable friction-wheel on said driven shaft, a non-magnetic frame, magnetizable driving-wheels journaled in said frame and engaging opposite faces of the driven wheel, means for adjusting said frame to vary the speed of the driven shaft and one or more electromagnets for increasing the adhesion between the engaging surfaces of the friction-wheels.

8. The combination with a driving-shaft and a pair of magnetizable friction-wheels driven thereby, of a driven shaft having a magnetizable wheel which projects between and is gripped by the driving friction-wheels and means for magnetizing said wheels to increase the gripping action.

9. The combination with a driving-shaft and a pair of magnetizable friction-wheels disposed in substantially the same plane and driven by said shaft, of a driven shaft having its axis at right angles to that of the driving-shaft, a driven friction-wheel the plane surfaces of which are engaged by the peripheries of the respective driving-wheels and means for magnetizing said wheels to increase their gripping action.

10. The combination with a driving-shaft, a frame and means for adjusting the same longitudinally of the shaft, of a pair of magnetizable friction-wheels journaled in said frame and connected to said shaft, a driven shaft having a wheel that projects between and at right angles to said pair of wheels and means for magnetizing said wheels to increase the gripping action thereof.

In testimony whereof I have hereunto subscribed my name this 30th day of March, 1903.

GEO. H. GIBSON.

Witnesses:
EARNEST T. CHILD,
R. R. SMART.